(12) United States Patent
Waser

(10) Patent No.: US 11,781,902 B2
(45) Date of Patent: Oct. 10, 2023

(54) REDUCING OPTICAL CROSS-TALK IN OPTICAL SENSOR MODULES

(71) Applicant: AMS INTERNATIONAL AG, Jona (CH)

(72) Inventor: Karl Georg Waser, Jona (CH)

(73) Assignee: AMS INTERNATIONAL AG, Jona (CH)

( * ) Notice: Subject to any disclaimer, the term of this patent is extended or adjusted under 35 U.S.C. 154(b) by 0 days.

(21) Appl. No.: 17/609,665

(22) PCT Filed: May 19, 2020

(86) PCT No.: PCT/EP2020/063955
§ 371 (c)(1),
(2) Date: Nov. 8, 2021

(87) PCT Pub. No.: WO2020/239538
PCT Pub. Date: Dec. 3, 2020

(65) Prior Publication Data
US 2022/0196465 A1      Jun. 23, 2022

Related U.S. Application Data

(60) Provisional application No. 62/853,771, filed on May 29, 2019.

(51) Int. Cl.
*G01J 1/02*     (2006.01)
(52) U.S. Cl.
CPC ........... *G01J 1/0214* (2013.01); *G01J 1/0271* (2013.01)

(58) Field of Classification Search
CPC ........ G01S 17/88; G01S 17/89; G01S 17/894; G01S 7/48; G01S 7/481; G01S 7/4811; G01S 7/4813; G01J 1/0271; G01J 1/02; G01J 1/0214
See application file for complete search history.

(56) References Cited

U.S. PATENT DOCUMENTS

| 9,905,722 | B1 * | 2/2018 | Chen ..................... G01S 17/04 |
| 2005/0110395 | A1 * | 5/2005 | Nagata ................. H01L 33/647 257/E33.072 |
| 2006/0131623 | A1 * | 6/2006 | Inoue ................ H01L 27/11521 257/E21.422 |
| 2015/0062392 | A1 * | 3/2015 | Lenchenkov ..... H01L 27/14621 257/432 |

(Continued)

FOREIGN PATENT DOCUMENTS

EP          3471152 A1     4/2019

OTHER PUBLICATIONS

International Search Report and Written Opinion dated Jun. 24, 2020 for corresponding International Application No. PCT/EP2020/063955.

*Primary Examiner* — John R Lee
(74) *Attorney, Agent, or Firm* — TAROLLI, SUNDHEIM, COVELL & TUMMINO L.L.P.

(57) ABSTRACT

An apparatus includes a substrate, a light emitter mounted on the substrate, and a light receiver, including a light sensitive region, mounted on the substrate. The substrate includes one or more light blocking vias arranged to prevent at least some light produced by the light emitter from traveling through the substrate and thereby generating optical cross-talk in the light receiver.

19 Claims, 4 Drawing Sheets

(56) References Cited

U.S. PATENT DOCUMENTS

| | | | |
|---|---|---|---|
| 2015/0109785 A1* | 4/2015 | Kerness | G01J 1/08 |
| | | | 362/253 |
| 2017/0090018 A1 | 3/2017 | Buettgen | |
| 2017/0284864 A1* | 10/2017 | Chen | G01J 1/0214 |
| 2018/0175095 A1* | 6/2018 | Sallin | H01L 31/1136 |
| 2018/0182913 A1 | 6/2018 | Chen | |
| 2022/0196465 A1* | 6/2022 | Waser | G01J 1/08 |

* cited by examiner

REDUCING OPTICAL CROSS-TALK IN OPTICAL SENSOR MODULES

RELATED APPLICATIONS

The present invention is a U.S. National Stage under 35 USC 371 patent application, claiming priority to Serial No. PCT/EP2020/063955, filed on 19 May 2020; which claims priority of U.S. Patent Application No. 62/853,771, filed on May 29, 2019, the entirety of both of which are incorporated herein by reference.

FIELD OF THE DISCLOSURE

The present disclosure relates to reducing optical cross-talk in optical sensor modules.

BACKGROUND

Various types of optical sensor modules, such as optical proximity sensor modules, ambient light sensor modules, ranging sensor modules such as time-of-flight (TOF) sensor modules, 2D imaging sensor modules, and 3D imaging sensor modules such as structured light sensor modules, can be integrated into smartphones and other portable computing devices. Many of these sensor modules include both light emitters and light sensors to perform their functions. For many applications, it is desirable to avoid internal cross-talk from the light emitter to the light sensor.

SUMMARY

The present disclosure describes techniques for reducing optical cross-talk in optical sensor modules.

For example, in one aspect, the present disclosure describes an apparatus includes a substrate, a light emitter mounted on the substrate, and a light receiver, including a light sensitive region, mounted on the substrate. The substrate includes one or more light blocking vias arranged to prevent at least some light produced by the light emitter from traveling through the substrate and thereby generating optical cross-talk in the light receiver.

Some implementations include one or more of the following features. For example, in some instances, at least one of the one or more light blocking vias does not serve an electrical function. The substrate further can include one or more electrically conductive vias that provide electrical functionality. In some cases, the substrate includes a printed circuit board. The light blocking vias can comprise, for example, copper. The light blocking vias can take various forms, such as through-hole, plated vias, blind vias, or buried vias. In some implementations, the light emitter includes at least one of a LED, a laser diode, a VCSEL or an edge emitting laser, and the light sensitive region includes at least one of a photodiode or an array of spatially distributed light sensitive elements. In some instances, the substrate includes a plurality of light blocking vias arranged to prevent at least some light produced by the light emitter from traveling through the substrate so as to generate optical cross-talk in the light receiver.

In another aspect, the present disclosure describes a method including performing a computer simulation with respect to an optical package design that includes a light emitter and a light receiver mounted on a substrate. The computer simulation identifies one or more paths through the substrate along which some light produced by the light emitter is likely to travel and be incident on the light receiver. The method further includes forming at least one light blocking via in the substrate. The at least one light blocking via is arranged to prevent at least some light produced by the light emitter from traveling through the substrate and thereby generating optical cross-talk in the light receiver when the light emitter and the light receiver are mounted on the substrate.

Some implementations include one or more of the following features. For example, in some instances, forming at least one light blocking via in the substrate includes forming a hole in the substrate and plating the hole with copper. The substrate can include a printed circuit board. In some cases, the at least one light blocking via does not serve an electrical function. The at least one light blocking via can take various forms such as a through-hole, plated via, a blind via or a buried via. In some implementations, the method includes forming a plurality of light blocking vias in the substrate wherein the light blocking vias are arranged to prevent at least some light produced by the light emitter from traveling through the substrate and thereby generating optical cross-talk in the light receiver when the light emitter and the light receiver are mounted on the substrate.

In some implementations, the light blocking vias can be made using the same technology as is used for formation of electrical vias. Thus, in some cases, the light blocking vias can be incorporated into the printed circuit board without additional manufacturing steps.

Other aspects, features and advantages will be readily apparent form the following detailed description, the accompanying drawings, and the claims.

DETAILED DESCRIPTION

Figure 1:
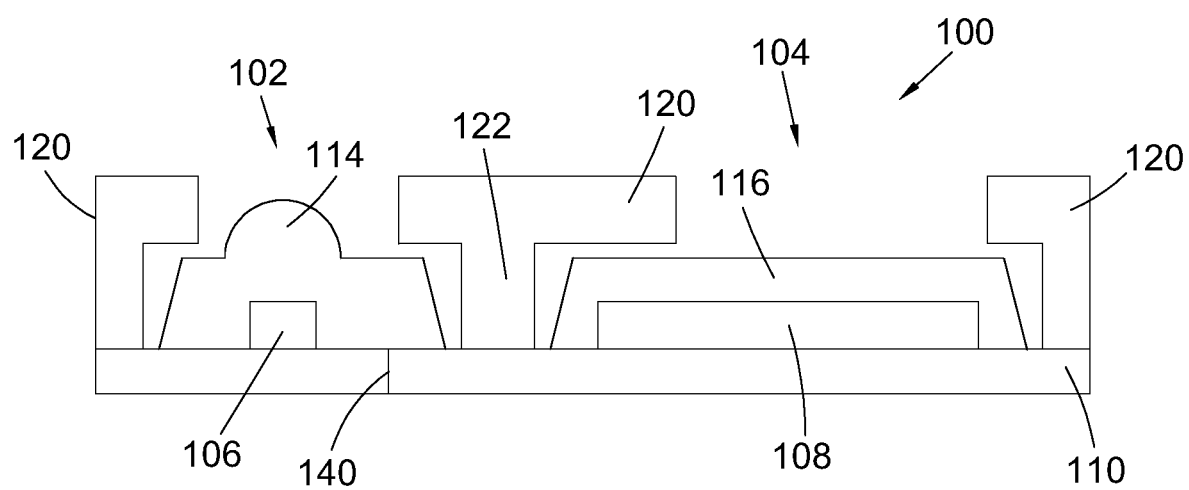
FIG. 1 is a cross-sectional view of an optoelectronic package.
Figure 2:
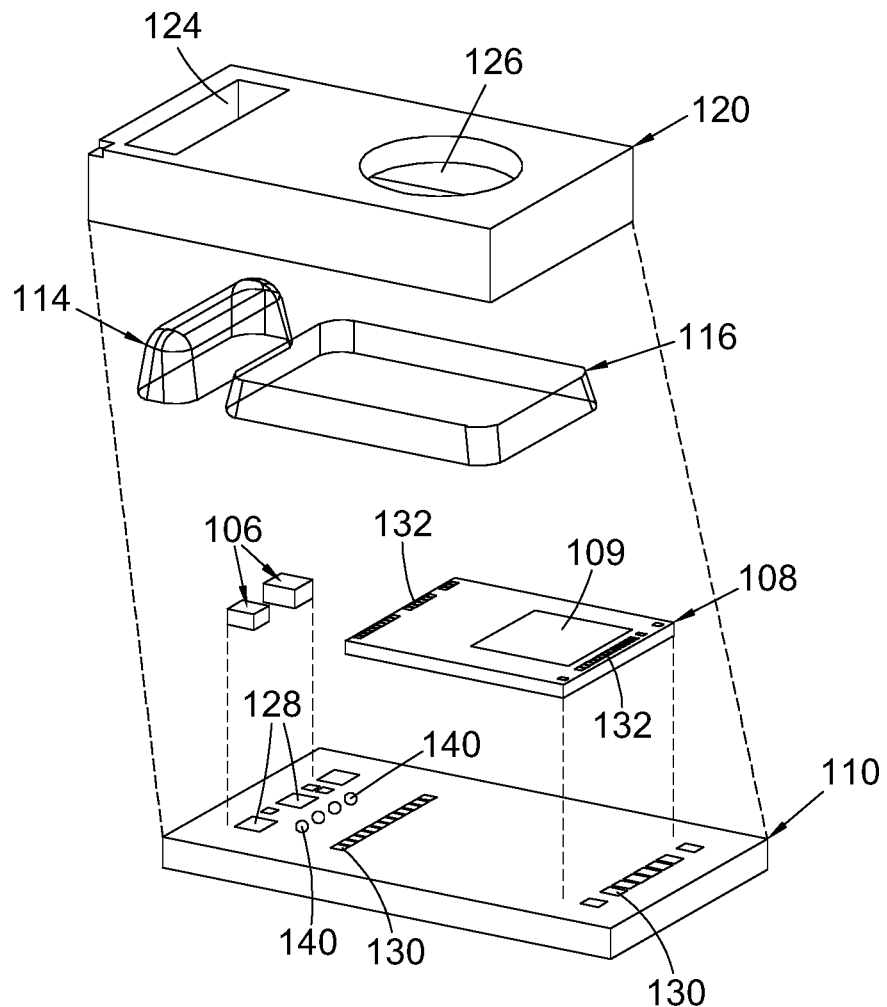
FIG. 2 is an exploded view of the optoelectronic package of FIG. 1

FIGS. 1 and 2 illustrate an example of an optoelectronic package 100 that includes a light emission channel 102 and a light detection channel 104. One or more light emitters 106 and a light receiver 108 can be mounted, for example, on a printed circuit board (PCB) or other substrate 110. Each light emitter 106 is operable to emit light at a particular wavelength or range of wavelengths. In some implementations, each light emitter 106 is implemented as a light emitting diode (LED), a laser diode, a vertical cavity surface emitting laser (VCSEL) or an edge emitting laser (EEL).

Respective molded lenses 114, 116 can be provided for each of the channels 102, 104. Light from the emitter(s) 106 is operable to be directed out of the package 100 through the lens 114. In some applications (e.g., proximity sensing), some of the light may be reflected by an object outside the package back toward the detection channel 104 where the light can be sensed by the light receiver 108 after passing through the lens 116.

The light receiver 108 can include, for example, a photodetector (e.g., any kind of photodiode or an array of spatially distributed light sensitive elements (e.g., SPADs)), and also may include logic and other electronics (e.g., an electronic control unit) to read and process signals from the photodetector. FIG. 2 indicates a photosensitive region 109 of the receiver 108. The sensor's electronic control circuit can be implemented, for example, as one or more integrated circuits in one or more semiconductor chips with appropriate digital logic and/or other hardware components (e.g., read-out registers; amplifiers; analog-to-digital converters; clock drivers; timing logic; signal processing circuitry; a microprocessor; and/or interfaces such as I2C or SPI). The control and processing circuitry, and associated memory, may reside in the same semiconductor chip as the light receiver 108 or in one or more other semiconductor chips. In some instances, the control and processing circuitry may be external to the package 100; for example, the control and processing circuitry can be integrated into a processor for a host device in which the package 100 is disposed.

A housing 120 having respective apretures 124, 126 (see FIG. 2) over the emitter and receiver channels 102, 104 can laterally surround the channels and also can serve as a cap for the package 100. The housing 120 can be composed, for example, of an epoxy or other polymer material that is substantially opaque to the wavelength(s) of light produced by the emitter(s) 106. In some applications, the emitters 106 are operable to produce infra-red (IR) light; in some implementations, one or more of the emitters may be operable to produce light in the visible or UV range of the spectrum. In some cases, an interior wall 122 portion of the housing 120 helps provide optical isolation between the light emission channel 102 and the light detection channel 104.

The emitter(s) 106 and the light receiver 108 can be connected electrically to the PCB 110, for example, by conductive pads and/or wire bonds. FIG. 2 illustrates examples of die pads 128 on which the light emitters 126 can be mounted. FIG. 2 also illustrates examples of conductive pads 130 on the PCB 110 for electrical connection (e.g., via wire bonds) to conductive pads 132 on the receiver 108.

The PCB 110, in turn, may be connected electrically to other components within a host device (e.g., a smartphone or other portable computing device). The design of smartphones and other portable computing devices referenced in this disclosure can include one or more processors, one or more memories (e.g. RAM), storage (e.g., a disk or flash memory), a user interface (which may include, e.g., a keypad, a TFT LCD or OLED display screen, touch or other gesture sensors, a camera or other optical sensor, a compass sensor, a 3D magnetometer, a 3-axis accelerometer, a 3-axis gyroscope, one or more microphones, etc., together with software instructions for providing a graphical user interface), inter-connections between these elements (e.g., buses), and an interface for communicating with other devices (which may be wireless, such as GSM, 3G, 4G, CDMA, WiFi, WiMax, Zigbee or Bluetooth, and/or wired, such as through an Ethernet local area network, a T-1 internet connection, etc.).

Although the interior wall 122 portion of the housing 120 can help provide optical isolation between the light emission channel 102 and the light detection channel 104, the PCB 110 may, in some instances, provide additional paths for internal optical cross-talk between the emitter(s) 106 and the light sensitive region 109 of the receiver 108 if appropriate measures are not taken. This can be particularly problematic where the PCB or other substrate 110 is composed of materials that allow the substrate 110 to serve as a waveguide that can couple light from the emitter(s) 106 to the receiver 108. The cross-coupling through the PCB or other substrate 110 may be a result of light produced by the emitter(s) 106 directly being directed into the PCB or other substrate, or may result from some of the emitter light being reflected, for example, by the presence of the aperture 124 over the emitter(s) 106.

To reduce or eliminate the potential paths for light produced by the emitter(s) 106 to travel through the PCB or other substrate 110 to the light sensitive region 109 of the receiver, one or more light blocking vias 140 are provided in the PCB or other substrate 110 (see FIG. 2). The light blocking vias 140 can be formed at locations within the PCB or other substrate 110 so as to intersect path(s) along which light from the emitter(s) 106 would otherwise travel to reach the light sensitive region 109 of the receiver 108. The light blocking vias 140 thus block light that was produced by the emitter(s) 106 and is traveling through the PCB or other substrate 110, where, in the absence of the light blocking via(s), the light would be incident on the receiver 108.

The ideal locations for the light blocking vias 140 within the PCB or other substrate 110 can be determined, for example, based on computer simulations for the particular package design. Such simulations can be performed for each emitter 106 to determine whether there are likely to be paths for significant optical cross-talk to occur through the PCB or other substrate 110 and, if so, how many vias 140 should be provided, as well as their precise positioning within the PCB or other substrate.

The PCB or other substrate 110 may include two different groups of vias: (i) a first group that provides electrical connections between different conductive layers of the PCB and provides electrical connections to or from the components mounted on the PCB (e.g., the emitter(s) 106 and the receiver 108), and (ii) a second group that provides the light blocking function to reduce internal optical cross-talk between the emitter(s) 106 and the receiver 108. In some instances, there may be partial or complete overlap between the two groups of vias. Thus, some or all of the vias may provide both electrical functionality as well as light blocking functionality. In other instances, at least some of the vias provide the light blocking function, but do not serve an electrical function.

In some instances, the PCB 110 is a thin board composed of fiberglass, composite epoxy, or other laminate material. Conductive pathways may be etched or printed onto the board, electrically connecting different components on the PCB. Formation of the light blocking vias 140 can be consistent with technology used to form the electrically conductive (e.g., copper) vias that connect, e.g., different metal layers of the PCB that are separated from one another by layers of non-conducting (e.g., dielectric) material. Thus, the light blocking vias 140 can be formed by providing holes partially or entirely through the PCB 110 at specified locations (e.g., by laser drilling), and plating or filling the holes (partially or entirely) with copper.

Figure 3:
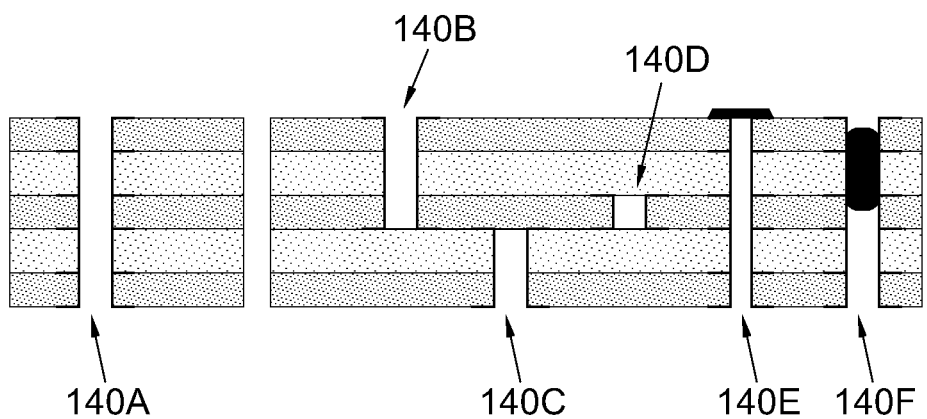
FIG. 3 illustrates various types of light blocking vias in a printed circuit board.

FIG. 3 illustrates different examples of vias 140A-140F that can serve as the light blocking vias 140. In some cases, the hole for the via is made conductive by electroplating (e.g., copper). The via 140A, for example, is a through-hole, plated via, whereas the blind vias 140B, 140C are exposed, respectively, only on one side of the PCB 110. The buried via 140D connects internal layers without being exposed on either surface of the PCB 110. For the tented or capped via 140E, the via hole is covered with solder mask. For the plugged via 140F, the via hole is sealed. In some implementations, all of the light blocking vias 140 are of the same type. In other cases, some of the light blocking vias 140 may be of a first type, whereas others of the light blocking vias 140 may be a second, different type.

Figure 4A:
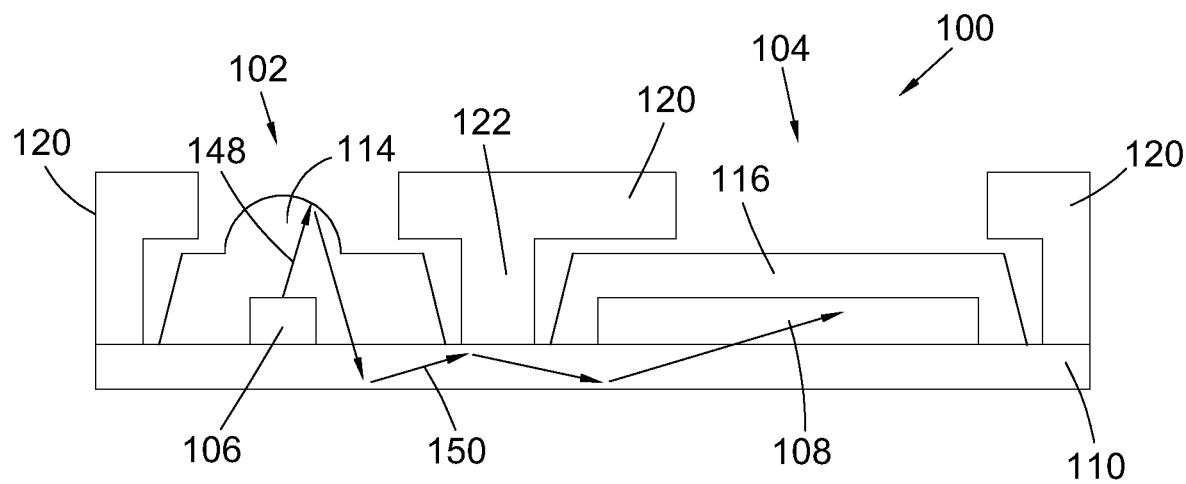
FIGS. 4A and 4B illustrate an example of how a light blocking via can reduce internal optical cross-talk.
Figure 4B:
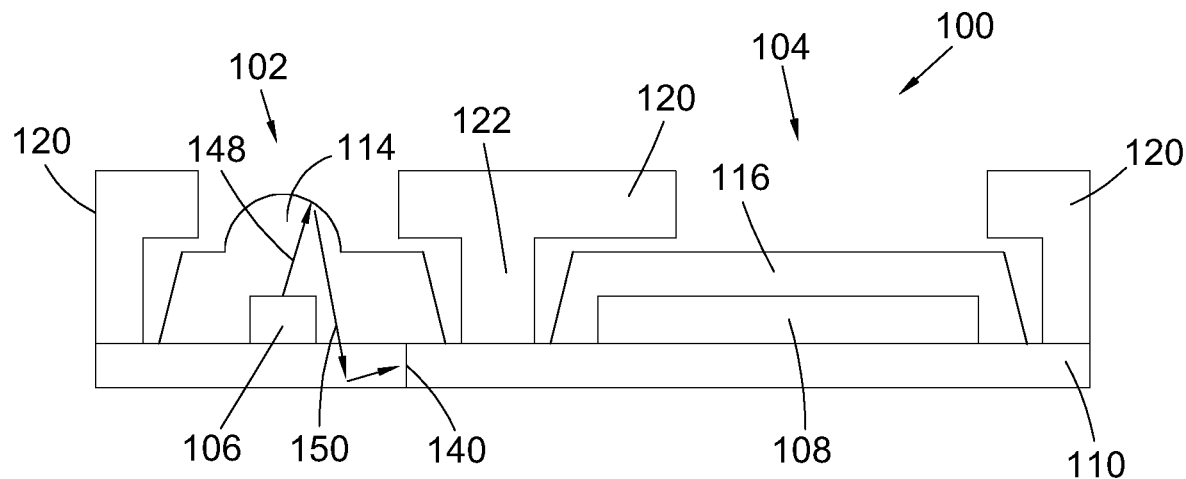

FIGS. 4A and 4B illustrate an example of how the presence of the light blocking via(s) 140 can be advantageous to reduce internal optical cross-talk. As shown in FIG. 4A, in the absence of a light blocking via, some of the light 148 produced by the emitter 106 may be reflected, for example, by the lens 114 back toward the PCB 110. The reflected light 150 then may be reflected within the PCB 110 such that it is incident on the light receiver 108 and, in particular, on the receiver's light sensitive region 109. On the other hand, as shown in FIG. 4B, the presence of one or more light blocking vias 140 can intersect the light path so as to block the light 150 and prevent it from reaching the light receiver 108. In some instances, light-blocking (e.g., copper) planes can be provided on the top and/or bottom substrate layers for further light shielding and to help reduce optical cross-talk within the optical package system.

Figure 5:
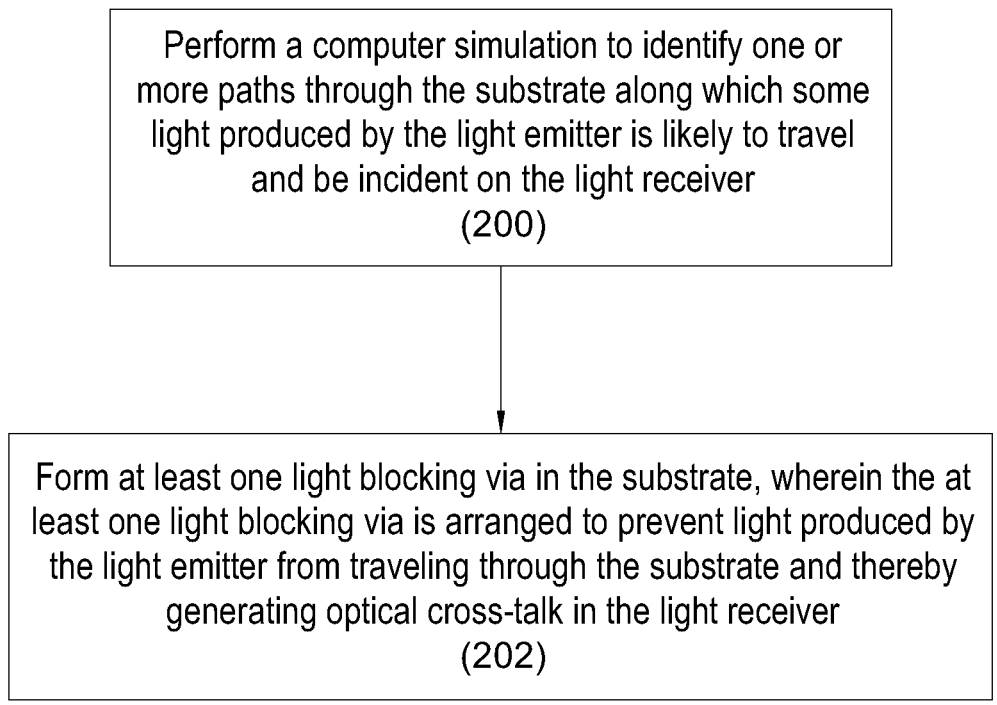
FIG. 5 is a flow chart of a method.

FIG. 5 is a flow chart illustrating operations in a method in accordance with the present disclosure. As indicated at 200, the method includes performing a computer simulation with respect to an optical package design that includes a light emitter and a light receiver mounted on a substrate (e.g., a PCB). The computer simulation identifies one or more paths through the substrate along which some light produced by the light emitter is likely to travel and be incident on the light receiver. As indicated at 202, the method further includes forming at least one light blocking via in the substrate, wherein the at least one light blocking via is arranged to prevent at least some light produced by the light emitter from traveling through the substrate and thereby generating optical cross-talk in the light receiver when the light emitter and the light receiver are mounted on the substrate.

When determining the placement the light blocking vias 140 in the PCB or other substrate 110, care should be taken to avoid creating electrical shorts that may interfere with or disrupt the proper electrical operation of the components in the package 100. On the other hand, the design rules for placement of the vias having an electrical function may be inapplicable to vias 140 that have only a light blocking function, but not an electrical function. Thus, in some instances, multiple vias 140 may be placed closer to one another than might be permissible using the design rules for placement of vias having an electrical function.

Various modifications will be readily apparent within the spirit of the present disclosure. Accordingly, other implementations are within the scope of the claims.

The invention claimed is:

1. An apparatus comprising:
a substrate;
a light emitter mounted on the substrate; and
a light receiver, including a light sensitive region, mounted on the substrate;
wherein the substrate includes one or more light blocking vias arranged to prevent at least some light produced by the light emitter from traveling through the substrate and thereby generating optical cross-talk in the light receiver, wherein at least one of the one or more light blocking vias does not serve an electrical function.

2. The apparatus of claim 1 wherein the substrate further includes one or more electrically conductive vias that provide electrical functionality.

3. The apparatus of claim 1 wherein the substrate comprises a printed circuit board.

4. The apparatus of claim 1 wherein the one or more light blocking vias comprise copper.

5. The apparatus of claim 1 wherein the one or more light blocking vias are through-hole, plated vias.

6. The apparatus of claim 1 wherein the one or more light blocking vias are blind vias.

7. The apparatus of claim 1 wherein the one or more light blocking vias are buried vias.

8. The apparatus of claim 1 wherein the light emitter includes at least one of a LED, a laser diode, a VCSEL or an edge emitting laser, and the light sensitive region includes at least one of a photodiode or an array of spatially distributed light sensitive elements.

9. The apparatus of claim 1 wherein the substrate includes a plurality of light blocking vias arranged to prevent at least some light produced by the light emitter from traveling through the substrate so as to generate optical cross-talk in the light receiver.

10. The apparatus of claim 1 including a light-blocking planes on at least one of a top or bottom of the substrate.

11. A method comprising:
performing a computer simulation with respect to an optical package design that includes a light emitter and a light receiver mounted on a substrate, wherein the computer simulation identifies one or more paths through the substrate along which some light produced by the light emitter is likely to travel and be incident on the light receiver; and
forming at least one light blocking via in the substrate wherein the at least one light blocking via is arranged to prevent at least some light produced by the light emitter from traveling through the substrate and thereby generating optical cross-talk in the light receiver when the light emitter and the light receiver are mounted on the substrate.

12. The method of claim 11 wherein forming at least one light blocking via in the substrate includes forming a hole in the substrate and plating the hole with copper.

13. The method of claim 11 wherein the substrate comprises a printed circuit board.

14. The method of claim 11 wherein the at least one light blocking via does not serve an electrical function.

15. The method of claim 11 wherein the at least one light blocking via comprises copper.

16. The method of claim 11 wherein the at least one light blocking via includes a through-hole, plated via.

17. The method of claim 11 wherein the at least one light blocking via includes a blind via.

18. The method of claim 11 wherein the at least one light blocking via includes a buried via.

19. The method of claim 11 including forming a plurality of light blocking vias in the substrate wherein the light blocking vias are arranged to prevent at least some light produced by the light emitter from traveling through the substrate and thereby generating optical cross-talk in the light receiver when the light emitter and the light receiver are mounted on the substrate.

* * * * *